United States Patent [19]

Bolding et al.

[11] 4,433,821

[45] Feb. 28, 1984

[54] CONDUIT BENDING AND SUPPORT DEVICE

[76] Inventors: Charles N. Bolding, 1504 Roundup Trail; Paul D. Hastings, 2000 Dixie La., both of Round Rock, Tex. 78664

[21] Appl. No.: 290,841

[22] Filed: Aug. 7, 1981

[51] Int. Cl.³ .............................................. F16L 3/08
[52] U.S. Cl. ...................................... 248/65; 248/73; 52/27
[58] Field of Search ............................ 52/27, 220, 698; 248/65, 67, 67.7, 73, 49; 226/196; 174/48

[56] References Cited

U.S. PATENT DOCUMENTS

| 2,163,947 | 6/1939 | Hochberger | 52/27 X |
| 4,366,341 | 12/1982 | van Riet | 52/220 X |

FOREIGN PATENT DOCUMENTS

| 659692 | 5/1938 | Fed. Rep. of Germany | 248/65 |
| 2725950 | 12/1978 | Fed. Rep. of Germany | 52/220 |
| 598363 | 2/1948 | United Kingdom | 248/65 |

Primary Examiner—Carl D. Friedman
Attorney, Agent, or Firm—Hubbard, Thurman, Turner & Tucker

[57] ABSTRACT

A bending and support bracket for non-rigid tubing such as polybutylene water distribution conduit includes a frame having end portions extending at substantially right angles to each other wherein each end portion has a bracket for supporting opposite ends of a bend to be formed in the tubing. A curved bend support surface is formed on the frame between the bracket portions and is provided with a flange which together with the frame provides lateral support for a major portion of the bend of the tubing. The bending and support device is advantageously used for providing bends in tubing to be run through concrete slabs and other portions of building structures.

7 Claims, 2 Drawing Figures

CONDUIT BENDING AND SUPPORT DEVICE

FIELD OF THE INVENTION

The present invention pertains to a bending and support device for flexible tubing, in particular plastic water conduit and the like for installation of said tubing in concrete slabs and other structures.

BACKGROUND ART

The use of plastic and other non-rigid piping and conduit for various applications in building construction, such as water distribution piping, has become widespread in recent years. The development of long life plastic piping for use in water distribution, for example, has improved the speed and ease with which plumbing may be installed in various building structures and other installations. The relative ease with which plastic water distribution conduit may be bent to change the direction of the conduit run has greatly reduced or eliminated the need for fittings for changing the direction of the conduit run and the associated operations necessary for installing the conduit such as is required with rigid steel pipe, for example.

However, the bendability of plastic tubing has presented certain problems associated with its installation. For example, the elasticity of plastic tubing, such as polybutylene tubing used for water conduit, requires that the tubing be adequately supported during and after the bending operation. This is true, particularly, if the tubing is being run through a concrete slab which is to be poured after the tubing is laid over the area to be occupied by the slab and extended to the various plumbing outlets within the building. Since the conduit runs must be installed before the slab is poured, it is necessary to support the tubing at the bends until the concrete solidifies around the tubing itself. For example, when water distribution conduit is laid within an area to be occupied by a concrete slab, the run of the conduit is preferably formed at right angles so that the conduit may project from the upper surface of the slab for connection to various fixtures within the structure supported by the slab. It is therefore highly desirable to provide a support which will hold the conduit in the proper position and bent at substantially right angles from the horizontal run and which support may be encased by the concrete when the slab is poured.

Another problem associated with bending flexible plastic as well as certain types of metal tubing pertains to the tendency for the tubing to kink or undergo plastic deformation if the bend radius is not carefully controlled and the conduit adequately supported during the bending operation. In particular, it has been a problem in the bending of polybutylene water distribution conduit to prevent the kinking of the conduit when making bends of various angles and in particular when the conduit is bent at right angles to change the direction of the conduit run.

The present invention is adapted to overcome the aforementioned problems in the installation of plastic non-rigid tubing or conduit used for water distribution. Moreover, the present invention may also be used for the bending and support of conduit used for various other applications such as, for example, the containment of electrical wiring and the like.

SUMMARY OF THE INVENTION

The present invention provides a bending and support device for use in conjunction with non-rigid cylindrical tubing or conduit for changing the direction of the conduit run in various structures.

In accordance with one aspect of the present invention, there is provided an improved bending and support device for use with plastic water distribution conduit for changing the direction of the conduit run through and out of a concrete slab, for example, which may be poured around the conduit and the support device.

In accordance with another aspect of the present invention, there is provided a conduit bending and support device comprising a bracket having portions extending at right angles to one another and including support tabs at the opposite ends of the angled portions into which, in supporting relationship, the conduit may be easily inserted.

Still further in accordance with the present invention, there is provided a bending and support device for use in connection with supporting non-rigid conduit and performing substantially right angle bends in said conduit for conduit runs through concrete slabs and the like and wherein said device includes bracket portions for engaging a supporting bar for holding the support device in a predetermined position. More particularly, the bending and support device is adapted to be itself supported by a piece of reinforcing bar to maintain the bending and support device in a predetermined position.

The present invention still further provides an improved bending and support device particularly adapted for use in conjunction with polybutylene flexible water conduit and the like wherein said device has a portion which is adapted to support the conduit for the bending operation without allowing the conduit to kink or undergo plastic deflection which would substantially reduce the flow area within the conduit or result in structural damage to the conduit. In particular, it has been determined in pursuing the present invention that a bending and support device for bending flexible plastic water conduit at substantially right angles should have a curved support portion for the inner radius of the conduit bend which has a non-circular radius of curvature to minimize the chance of kinking or collapsing the conduit during the bending operation.

Still further in accordance with the present invention, there is provided a bending and support device for flexible plastic tubing or the like which has a channel for retaining the tubing in engagement with a portion of the device which supports the inner radius of the tubing bend and minimizes the change in the cross-sectional shape of the tubing through the bend therein.

The present invention still further provides a bending and support device for non-rigid tubing or conduit which may be easily fabricated of inexpensive material.

Those skilled in the art will further appreciate the superior features of the present invention upon reading the detailed description which follows in conjunction with the drawings.

DESCRIPTION OF THE PREFERRED EMBODIMENT

Figures 1, 2:
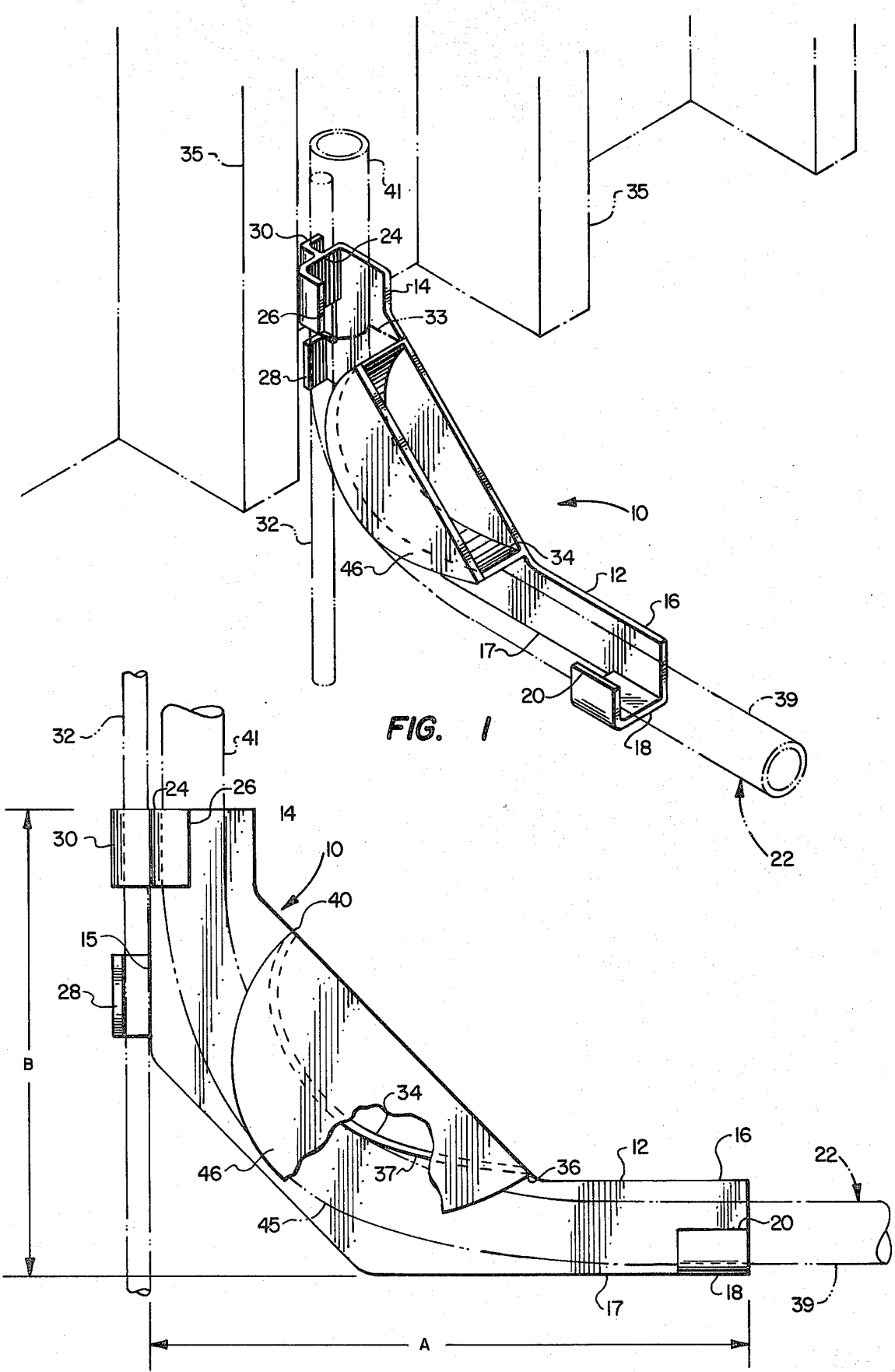
FIG. 1 is a perspective view of the conduit bending and support device of the present invention in a typical working position.
FIG. 2 is a longitudinal side elevation of the bending and support device illustrated in FIG. 1.

Referring to the drawing figures, the conduit bending and support device of the present invention is illustrated and generally designated by the numeral 10. The device 10 is characterized by a somewhat L-shaped frame portion 12 having opposite end portions 14 and 16 extending substantially at right angles to one another. The device 10 is preferably fabricated of molded plastic but may be formed of steel plate having a nominal thickness of 0.125 inches. Other materials may also be used for the device 10, however.

The frame portion 16 includes at its distal end a support bracket part 18 having an upturned leg 20 for retaining a portion of the conduit supported thereby. In the Drawing FIGS. 1 and 2, the conduit or tubing is generally designated by the numeral 22. Referring further to the drawing figures, the frame portion 14 also includes a laterally extending bracket part 24 having an upturned leg 26 for retaining the conduit in supportive relationship with the device 10. The frame 12 also includes a tab part 28, the distal end of which is bent at right angles to the plane of the frame and is disposed inward from the distal end of the frame portion 14. The bracket part 24 includes a tab part 30 similar to and facing opposite the tab part 28 and which is positioned on the base of the bracket part 24 to form an enclosure for supporting the device 10 by a piece of reinforcing bar 32. The tab parts 28 and 30 are dimensioned to provide a relatively close fit of the reinforcing bar 32 within the enclosure formed by the tab parts. Accordingly, when the device 10 is being used to support a bend in a conduit run through a concrete slab 33, as illustrated in FIG. 1, the device 10 itself may be easily supported by merely locating the device in the preferred position and driving a relatively short piece of reinforcing bar 32 generally vertically into the ground beneath which the slab is to be poured. Alternatively, the device 10 may be rotated such that the end portion 16 is projecting vertically upward and whereby the tabs 28 and 30 may be engaged with a horizontally extending piece of reinforcing bar such as might be provided as part of a steel reinforcing net or the like. The device 10 might also be used to form and support horizontal tubing bends. The tab parts 28 and 30 may also be formed as closed loops or tubular portions for totally surrounding the piece of reinforcing bar.

Referring particularly to FIG. 2, the bending and support device 10 includes a curved support member 34 which projects perpendicular to the plane of the frame plate 12 and which provides support for the conduit or tubing along the inner radius of a bend formed in the tubing as illustrated. The member 34 is preferably formed integral with the frame 12 and has a predetermined curvature in accordance with the present invention as illustrated in the drawing figure. As illustrated in FIG. 2 of the drawings, the end 36 of the member 34 is positioned such that the curvature of the supporting surface 37 is substantially tangent to a line parallel to the longitudinal center line of the straight run 39 of the conduit 22. The opposite end 40 of the curved surface 37 has a sharper radius of curvature than the end portion 36. In fact, the radius of curvature decreases from the end 36 to the end 40. Moreover, the surface 37 extends beyond a point of tangency with a line parallel to the longitudinal center line of the run 41 of the conduit 22, which run is substantially perpendicular to the run 39. The curvature of the surface 37 is extended to the end 40 to provide for inserting the conduit between the member 34 and the leg portion 26 into the channel formed by the bracket part 24 for support by the device 10.

The device 10 is also provided with a retaining flange 46 which is mounted on the support member 34 in spaced parallel relation to the plane of the frame plate 12. Accordingly, the frame 12 and the retaining flange 46 provide a channel therebetween in which a portion of the bend 45 of the conduit 22 is disposed. A portion of the flange 46 is broken away in FIG. 2 for illustration purposes. The distance between the inner surfaces of the flange 46 and the frame plate 12 adjacent to the support member 34 is only slightly greater than the nominal outside diameter of the conduit 22 so that when the conduit is inserted in the channel formed between the frame plate and the flange 46, additional support for the conduit to resist deformation is provided. For example, when flexible conduit such as polybutylene tubing is bent, the cylindrical cross-sectional shape of the tubing tends to flatten into an oval or elliptical shape thereby contributing to the tendency for the tubing to kink. The support provided for the outside diameter of the tubing by the spaced surfaces of the flange and the frame plate 12 reduces the tendency for kinking or plastic deformation to occur.

As will be noted from the drawing figures, the leg portions 14 and 16 are of unequal length. In accordance with a preferred embodiment of the present invention, the Length A of the leg portion 16 of the frame plate 12 as measured from a line coincident with the longitudinal edge 15 of the leg portion 14 is greater than the Length B of the leg portion 14 as measured from the longitudinal edge 17 of the leg portion 14. In a bending and support device for 0.875 inch outside diameter polybutylene water conduit, the dimensions A and B indicated on the Drawing FIG. 2 are 8.45 inches and 6.37 inches, respectively. The radius of curvature of the surface 37 varies from approximately 1.50 inches at the end 40 to 4.60 inches at the end 36. The Cartesian coordinates of the respective points of the surface 37 as measured from the longitudinal edges 15 and 17 are, respectively, for the end 36, approximately 5.18 inches and 1.27 inches, and for the end 40, 1.88 inches and 4.68 inches.

In use for bending and supporting non-rigid conduit and the like in a typical application, a straight piece of conduit is inserted in the device between the edge of the leg 26 and the periphery of the flange 46. The device 10 is then essentially rotated clockwide, viewing FIG. 2, until the bracket part 18 can be slipped under the conduit 22 along the run 39. The device 10 may then be supported in a particular desired position, such as between structural members 35 shown in FIG. 1, by inserting a piece of reinforcing bar 32 through the tab parts 30 and 28 and driving the bar into the ground or otherwise securing the bar against a structural member of the building. In this regard also, the tab parts 28 and 30 could be modified to be of a different shape and to be formed for fastening to a structural member adjacent to the device such as one of the studs 35.

It will be appreciated from the foregoing that various modifications and substitutions may be made to the specific embodiment of the invention disclosed herein without departing from the scope and spirit of the appended claims. For example, the exact radius of curvature of the surface 37 might be varied to accommodate different materials and wall thicknesses of the conduit which is to be bent around the surface 37. Moreover, the dimensional relationship of the legs 14 and 16 with respect to each other might also be varied in accordance with the diameter and wall thickness of the tubing supported by the device 10. The exact shape of the curved outer surface of the flange 46 is not critical, but it is important that the flange be sufficient to provide support for the side of the conduit through a major portion of the bend 45.

Other substitutions and modifications may be made without departing from the inventive concept embraced by the appended claims.

What is claimed is:

1. A bending and support device for non-rigid tubing such as plastic water distribution conduit and the like for changing the direction of a conduit run and supporting said conduit in the bent condition, said device comprising:
   a frame comprising a substantially flat plate including at least two end portions extending at an angle with respect to each other;
   a first conduit support bracket fixed to one end portion;
   a second conduit support bracket fixed to the other end portion, said support brackets each including respective portions forming channels for receiving and supporting said conduit at opposite ends of a bend in said conduit;
   surface means fixed to said frame between said support brackets for supporting said conduit along at least a portion of the inner radius of a bend in said conduit; and
   said support brackets are spaced from said surface means sufficiently to permit engaging said conduit by said support brackets and said surface means intermediate the ends of said conduit and without extending an end of said conduit through the channel formed by either of said support brackets.

2. A bending and support device for non-rigid tubing such as plastic water distribution conduit and the like for changing the direction of a conduit run and supporting said conduit in the bent condition, said device comprising:
   a frame including at least two end portions extending at an angle with respect to each other;
   a first conduit support bracket fixed to one end portion;
   a second conduit support bracket fixed to the other end portion;
   surface means formed on a member fixed to said frame between said suppport brackets for supporting said conduit along at least a portion of the inner radius of a bend in said conduit, said member providing said surface means with a curved portion for supporting said bend in said conduit, the radius of curvature of said surface means being greater at one end of said surface means than at the other end of said surface means; and
   said support brackets are spaced from said surface means so as to provide for bending said conduit to have opposed runs extending substantially perpendicular to each other.

3. The device set forth in claim 2 wherein:
   the end of said surface means having the greater radius of curvature is spaced further from the adjacent one of said support brackets than the end of said surface means having the lesser radius of curvature is spaced from the other of said support brackets.

4. A bending and support device for non-rigid tubing such as plastic water distribution conduit and the like for changing the direction of a conduit run and supporting said conduit in the bent condition, said device comprising:
   a frame including at least two end porions extending at an angle with respect to each other;
   a first conduit support bracket fixed to one end portion;
   a second conduit support bracket fixed to the other end portion;
   surface means fixed to said frame between said support brackets for supporting said conduit along at least a portion of the inner radius of a bend in said conduit; and
   means comprising a pair of oppositely projecting spaced apart angle tabs on said frame for receiving a support bar for supporting said device in a position to direct said conduit in a substantially vertical direction beyond one end of said bend.

5. A bending and support device for non-rigid tubing such as plastic water distribution conduit and the like for changing the direction of a conduit run and supporting said conduit in a bent condition, said device comprising:
   a frame including at least two end portions extending at an angle with respect to each other;
   a first conduit support bracket fixed to one end portion;
   a second conduit support bracket fixed to the other end portion, said support brackets each including respective portions forming channels for receiving and supporting said conduit at opposite ends of a bend in said conduit;
   surface means fixed to said frame between said support brackets for supporting said conduit along at least a portion of the inner radius of a bend in said conduit;
   flange means extending along opposite sides of said surface means and forming a channel facing opposite the channels formed by said support brackets for retaining the portion of said conduit engaged by said surface means; and
   said support brackets are spaced from said surface means sufficiently to permit engaging said conduit by said support brackets and said surface means and retention of said conduit in said channels intermediate the ends of said conduit and without extending an end of said conduit through the channels formed by said support brackets and said flange means.

6. The device set forth in claim 5 wherein:
   at least one of said flange means extends from said surface means a progressively greater distance from opposite ends of said surface means to a maximum at substantially the midpoint of said bend in said conduit.

7. The device set forth in clam 5 wherein:
   the widths of said channels formed by said support brackets and said surface means are only slightly greater than the diameter of said conduit.

* * * * *